United States Patent [19]

Nagel

[11] 4,047,019
[45] Sept. 6, 1977

[54] COMBINED CLEARANCE AND MARKER LAMP

[75] Inventor: Robert I. Nagel, Skokie, Ill.

[73] Assignee: Dominion Auto Accessories Limited, Toronto, Canada

[21] Appl. No.: 706,746

[22] Filed: July 19, 1976

[51] Int. Cl.² ............................................. B60Q 1/32
[52] U.S. Cl. ................................. 240/8.2; 240/106.1; 340/87
[58] Field of Search ........................ 240/8.2, 8.22, 8.3, 240/7.1 R, 106.1; 340/87, 89

[56] References Cited

U.S. PATENT DOCUMENTS

| | | | |
|---|---|---|---|
| 2,184,208 | 12/1939 | Brown et al. | 240/8.2 |
| 2,343,598 | 3/1944 | Wagner | 240/8.2 X |
| 3,184,590 | 5/1965 | Nagel | 240/8.2 X |
| 3,222,512 | 12/1965 | Dickson | 240/8.2 |
| 3,831,018 | 8/1974 | Weber | 240/8.2 |

*Primary Examiner*—Richard L. Moses

*Attorney, Agent, or Firm*—Barnes, Kisselle, Raisch & Choate

[57] ABSTRACT

A combined clearance and marker lamp comprising a generally rectangular housing having a base wall and a peripheral wall surrounding the base wall and having side wall portions and end wall portions. Longitudinally spaced light bulbs are mounted in the housing with at least the filaments of the bulbs beneath the plane of the upper edges of the peripheral wall of the housing. A lens of transparent material is mounted on the housing and has a top wall, side walls and end walls telescoped over the side and end wall portions of the housing. The top wall of the lens has longitudinally spaced sets of arcuate ribs on the inside surface thereof. The top wall has a prism on the inside surface of the top wall adjacent each end wall of the lens for directing light from the bulbs longitudinally outwardly through the end walls. Each side wall of the lens has a second prism on the outer surface thereof to direct the light longitudinally of the lamp.

15 Claims, 13 Drawing Figures

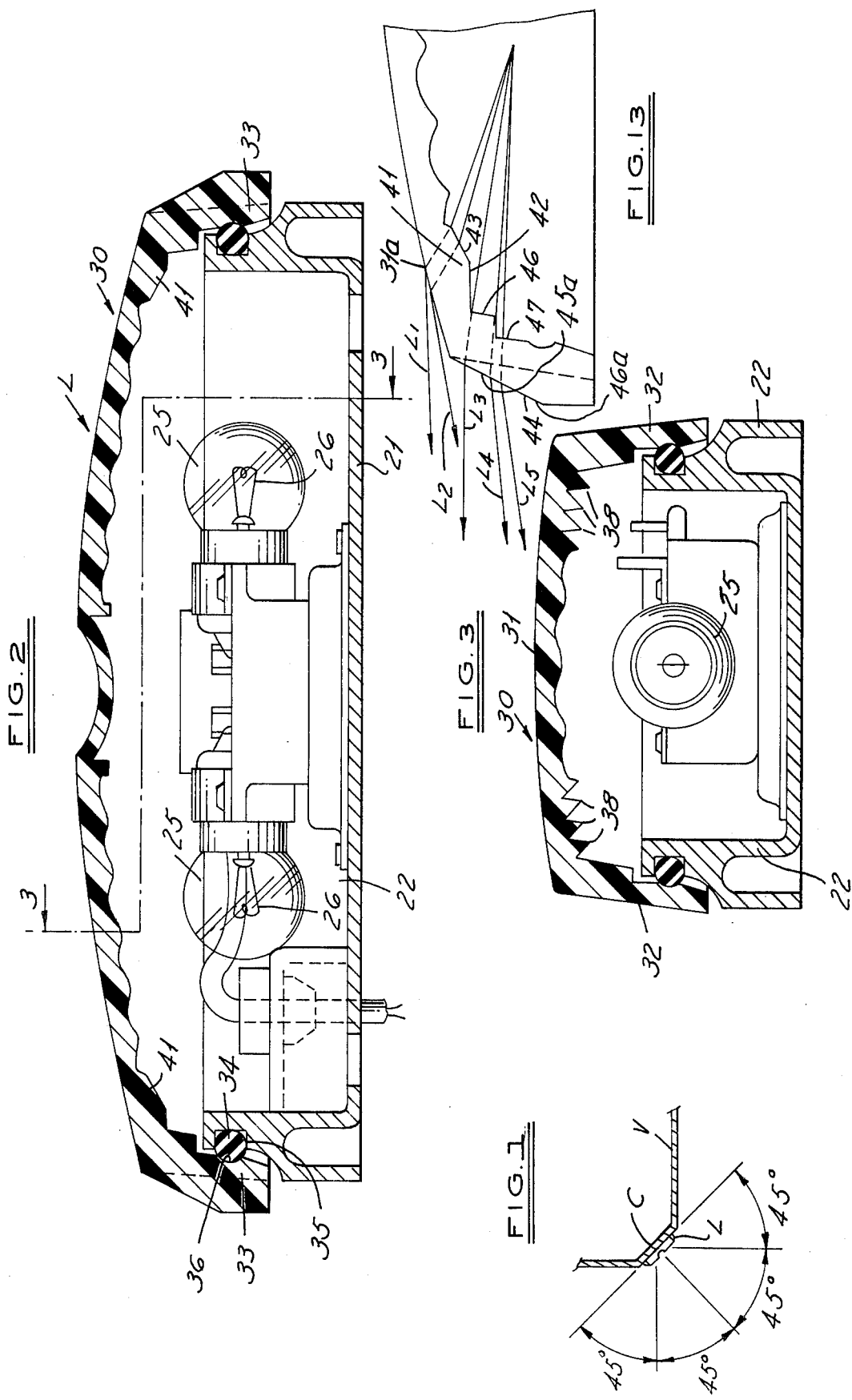

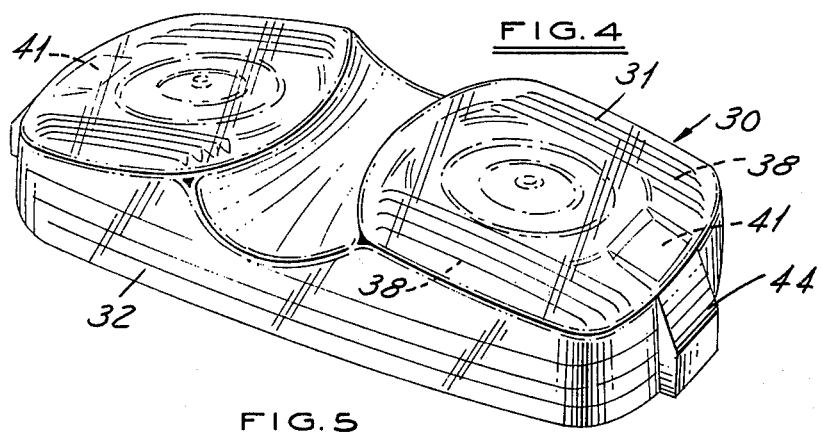
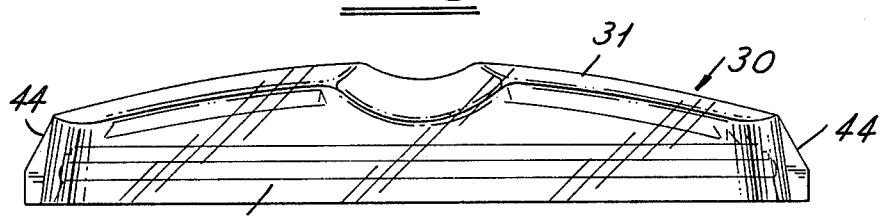
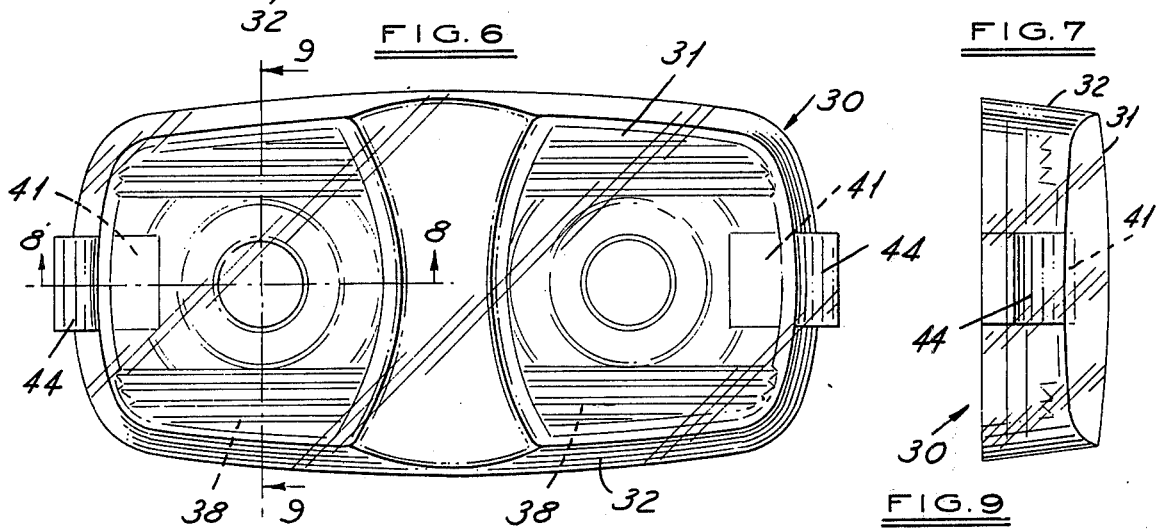
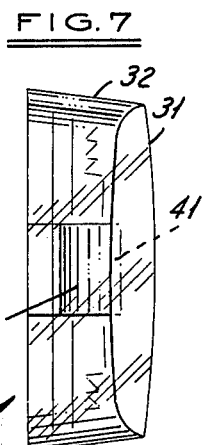
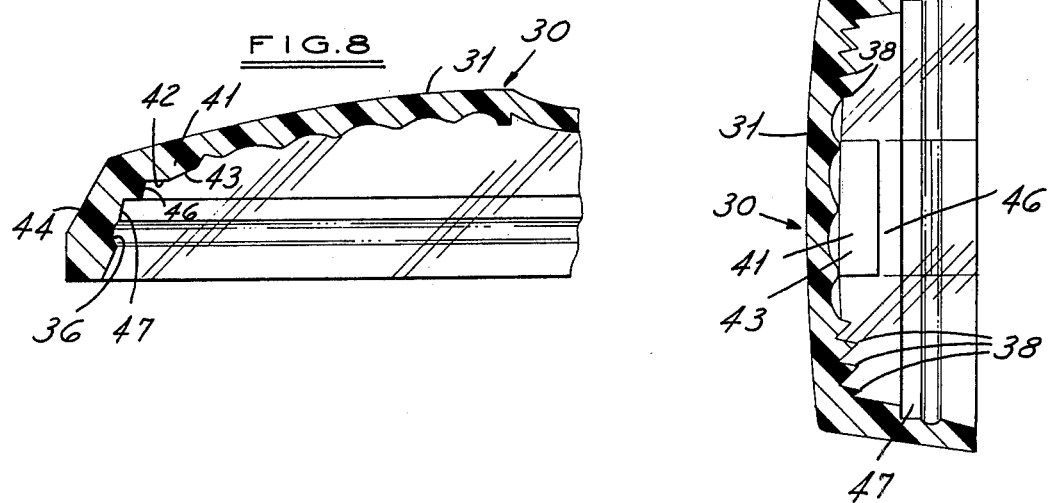
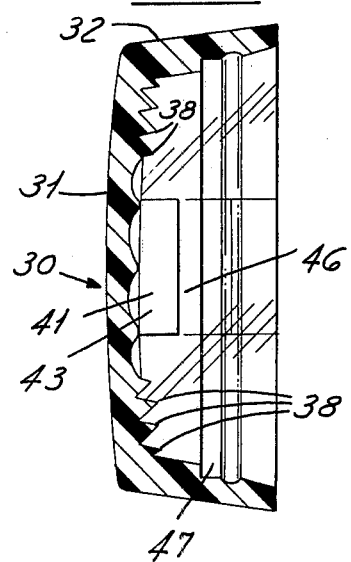

COMBINED CLEARANCE AND MARKER LAMP

This invention relates to combined clearance and marker lamps and particularly to a marker lamp which can be utilized as both a clearance and marker lamp.

BACKGROUND OF THE INVENTION

In vehicles, it has been common to utilize marker lamps which are mounted on the vehicle along the sides of the vehicle near the front and rear edges to indicate the overall length of the vehicle as well as along intermediate locations on the sides of the vehicle. It has also been common to utilize clearance lamps at the front or rear of a vehicle near the upper left and right extreme edges to indicate the overall width and height of the vehicle.

In one type of side marker lamp that has been conventionally used, the lamp comprises a housing in which a pair of bulbs is mounted and a lens overlying the housing. In such a lamp, the housing includes a peripheral wall having side and end portions that normally prevent illumination longitudinally so that the side marker lamp cannot be utilized at the corners of the vehicle as a clearance lamp and side marker lamp.

Among the objects of the invention are to provide a combined clearance and marker lamp that can be utilized at the front and rear of the vehicle to delineate the overall width, height and length of the vehicle and can also be used as a side marker lamp on the side of the vehicle.

SUMMARY OF THE INVENTION

In accordance with the invention, a side marker lamp of the aforementioned construction has a prism on the inside surface of the top wall adjacent each end wall for directing light from the bulbs longitudinally outwardly and a prism on the outer surface of each end wall of the lens to direct the light longitudinally.

DESCRIPTION OF THE DRAWINGS

FIG. 1 is a diagrammatic view showing the manner in which a clearance and side marker lamp embodying the invention is utilized on a vehicle to perform the functions of indicating both clearance and the sides of the vehicle.

FIG. 2 is a longitudinal sectional view through a combined clearance and side marker lamp embodying the invention.

FIG. 3 is a sectional view taken along the line 3—3 in FIG. 2.

FIG. 4 is a perspective view of the lens utilized in the lamp embodying the invention.

FIG. 5 is a side elevational view of the lens.

FIG. 6 is a top plan view of the lens.

FIG. 7 is an end view of the lens.

FIG. 8 is a fragmentary sectional view on an enlarged scale taken along the line 8—8 in FIG. 6.

FIG. 9 is a sectional view taken along the line 9—9 in FIG. 6.

FIG. 13 is a diagrammatic ray diagram showing the path of typical light rays through a portion of the lens.

DESCRIPTION

Figure 10:
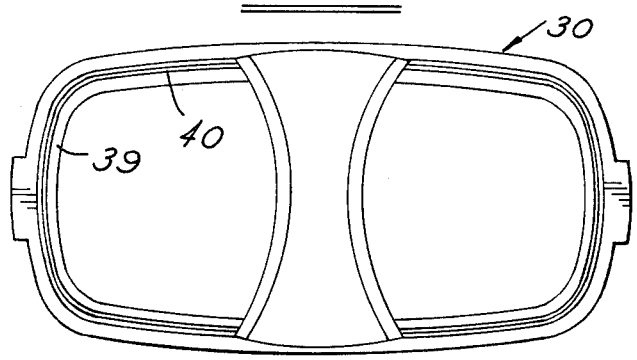
FIG. 10 is a bottom plan view of the lens.

Referring to FIG. 1, the invention is directed to a combined clearance and marker lamp L that can be mounted at the corners C of a vehicle V at an angle of 45° to the longitudinal and transverse axes of the vehicle near the upper left and right extreme edges to indicate the overall width, height and length of the vehicle.

Referring to FIGS. 2 and 3, the lamp L comprises a housing 20 that includes a base wall 21, preferably made of metal, and a peripheral wall having side wall portions 22 and end wall portions 23. A support 24 on the base wall 21 supports bulbs 25 at longitudinally spaced areas within the base, the filaments 26 of the bulbs 25 being below the plane defined by the upper edges of the side wall portions 22 and end wall portions 23.

A lens 30 of transparent material such as plastic is provided on the housing and includes a top wall 31, side walls 32 and end walls 33. As shown in FIGS. 2 and 3, lens 30 is held in position by frictional engagement with an O-ring 34 that is positioned in a groove 35 in the peripheral wall of the housing and engages an arcuate groove 36 in the side and end walls 32, 33 of the lens 30 which surround the peripheral wall of the base.

As shown in FIGS. 4-6, the top wall 31 of the lens 30 has upwardly and inwardly inclined convex portions 31a extending upwardly and inwardly toward a central concave portion 31b with exterior surfaces of the portions 31a, 31b being smooth. Each side wall 32 is generally straight in vertical cross section (FIG. 9) and slightly convex in horizontal cross section (FIG. 6). Each end wall has a smooth outer surface which is convex in horizontal view as shown in FIG. 6.

As further shown in FIGS. 4-9, the inner surface of top wall 31 is formed with two sets of annular ribs 37 spaced longitudinally of one another generally overlying bulbs 25, each rib 37 comprising a curved apex connected by a concave valley. The inner surface of top wall 31 further includes two sets of longitudinally extending parallel prisms 38 which are V-shaped and assymetrical and extend along the longitudinal edges of the spaced portions 31a of the top wall 31. In addition, the lens 30 includes spaced annular shoulders 39, 40 on the side and end walls thereof below the area of juncture of the side and end walls with the top wall.

In accordance with the invention, the lens is designed and constructed in order to provide light throughout a 180° arc as viewed in FIG. 1, even though the filaments 26 are below the plane of the top edges of the side and end wall portions 22, 23 of the housing 20.

In accordance with the invention, a prism 41 is provided at the ends of the top wall 31 adjacent the area of juncture of the top wall 31 with the end walls 33 centrally located transversely of the lens 30 and spaced from the side walls 32. Each prism 41 is generally rectangular and includes a horizontal surface 42 and inclined surface 43 providing an obtuse angle therebetween.

Further, in accordance with the invention, the outer surface of each end wall 33 of the lens is formed with a prism 44 that includes flat surfaces 45a, 46a that are angularly related to one another and spaced outwardly from the general contour of each respective end wall 33.

When a lamp embodying the invention is illuminated by energization of the bulbs, the prisms 41, 44 direct light longitudinally of the lens as shown by light rays $L_1$, $L_2$, $L_3$, $L_4$ and $L_5$ in FIG. 13. Specifically, surfaces 43 and 31a coact to refract typical rays $L_1$, $L_2$ toward the horizontal; surfaces 46 and 45a coact to refract typical rays $L_3$, $L_4$; and surfaces 47 and 46a coact to refract typical ray $L_5$. As a result, the combined marker and clearance lamp meets the standards set in the vehicle industry for use in the manner shown in FIG. 1.

Figure 11:
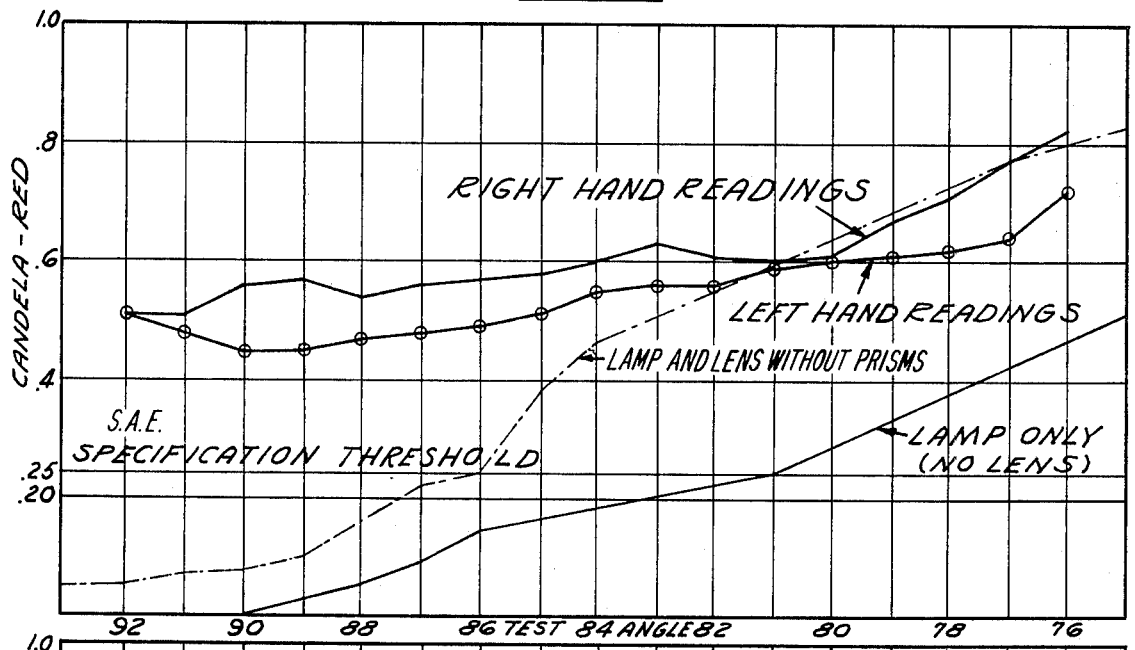
FIGS. 11 and 12 are curves of tests of the lamp embodying the invention.
Figure 12:
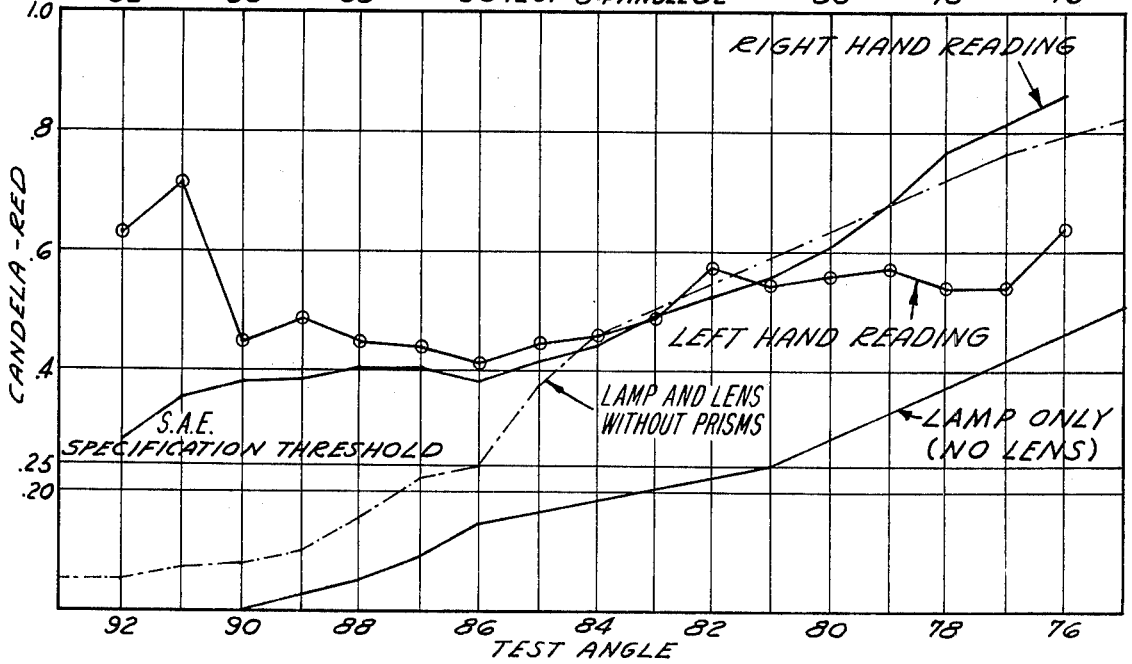

The lamp embodying the invention has been found to produce results such as summarized in the curves of FIGS. 11 and 12 wherein it can be seen that in the area approaching 90° to a perpendicular to the base of the lamp, the lamp embodying the invention produces sufficient lateral direction of light at the angles approaching 90° as to meet the standards as contrasted to a lamp shown in broken lines without the prisms or as a lamp without a lens as shown in solid lines.

I claim:

1. A combined clearance and marker lamp comprising
   a generally rectangular housing having a base portion and a peripheral wall including side wall portions and end wall portions,
   means for supporting a pair of light bulbs in longitudinally spaced relation in said housing with at least the filaments of said bulbs beneath the plane of the upper end of the peripheral wall of the housing,
   a lens of transparent material on said housing and having a top wall, side walls and end walls telescoped over the side and end wall portions of the housing,
   said top wall of said lens having longitudinally spaced sets of arcuate ribs on the inside surface of the top wall,
   each said end wall of said lens having a prism on the outer surface thereof to direct the light longitudinally thereof.

2. The combination set forth in claim 1 wherein said top wall has a first prism on the inside surface thereof at each end thereof for directing light from said bulb longitudinally outwardly through the end walls,
   said prism comprising a pair of angularly related surfaces with the apex of said prism extending transversely of the lens.

3. The combination set forth in claim 2 wherein each said prism comprises a first surface spaced outwardly from said end wall and a second surface angularly related to said first surface and extending upwardly and inwardly and in outwardly spaced relation to said end wall.

4. The combination set forth in claim 3 wherein each said arcuate rib comprises a curved apex connected to an adjacent rib by a concave valley.

5. The combination set forth in claim 4 wherein said top wall of said lens has longitudinally extending ribs on the inner surface thereof along the edges thereof transversely of said sets of arcuate ribs.

6. The combination set forth in claim 5 wherein said longitudinally extending ribs comprise prisms having angularly related surfaces.

7. The combination set forth in claim 6 wherein said prisms are assymetrical.

8. A lens for a combined clearance and marker lamp comprising
   a lens body of transparent material on said housing and having a top wall, side walls and end walls telescoped over the side and end wall portions of the housing,
   said top wall of said lens having longitudinally spaced sets of arcuate ribs on the inside surface of the top wall,
   each said end wall of said lens having a prism on the outer surface thereof to direct the light longitudinally thereof.

9. The combination set forth in claim 8 wherein said top wall has a first prism on the inside surface thereof at each end thereof of the top wall for directing light from said bulbs longitudinally outwardly through the end walls,
   said prism comprising a pair of angularly related surfaces with the apex of said prism extending transversely of the lens.

10. The combination set forth in claim 9 wherein each said first prism comprises a first surface spaced outwardly from said end wall and a second surface angularly related to said first surface and extending upwardly and inwardly and in outwardly spaced relation to said end wall.

11. The combination set forth in claim 10 wherein each said arcuate rib comprises a curved apex connected to an adjacent rib comprises a curved apex connected to an adjacent rib by a convex valley.

12. The combination set forth in claim 11 wherein said top wall of said lens has longitudinally extending ribs on the inner surface thereof along the edges thereof transversely of said sets of arcuate ribs.

13. The combination set forth in claim 12 wherein said longitudinally extending ribs comprise prisms having angularly related surfaces.

14. The combination set forth in claim 13 wherein said prisms are assymetrical.

15. A combined clearance and marker lamp comprising
    a generally rectangular housing having a base portion and a peripheral wall including side wall portions and end wall portions,
    means for supporting a pair of light bulbs in longitudinally spaced relation in said housing with at least the filaments of said bulbs beneath the plane of the upper end of the peripheral wall of the housing,
    a lens of transparent material on said housing and having a top wall, side walls and end walls telescoped over the side and end wall portions of the housing,
    said top wall of said lens having longitudinally spaced sets of arcuate ribs on the inside surface of the top wall,
    each said end wall of said lens having means on the outer surface thereof to direct the light longitudinally thereof.

* * * * *